United States Patent
Brown

(10) Patent No.: US 12,202,761 B2
(45) Date of Patent: Jan. 21, 2025

(54) TROUGH TO THERMALLY BALANCE LOADED GOB TEMP

(71) Applicant: Steven J. Brown, North Granby, CT (US)

(72) Inventor: Steven J. Brown, North Granby, CT (US)

(73) Assignee: Emhart Glass S.A., Steinhausen (CH)

( * ) Notice: Subject to any disclaimer, the term of this patent is extended or adjusted under 35 U.S.C. 154(b) by 179 days.

(21) Appl. No.: 17/070,409

(22) Filed: Oct. 14, 2020

(65) Prior Publication Data

US 2021/0107821 A1    Apr. 15, 2021

Related U.S. Application Data

(60) Provisional application No. 62/915,359, filed on Oct. 15, 2019.

(51) Int. Cl.
*C03B 7/16*    (2006.01)

(52) U.S. Cl.
CPC ..................... *C03B 7/16* (2013.01)

(58) Field of Classification Search
None
See application file for complete search history.

(56) References Cited

U.S. PATENT DOCUMENTS

| | | | |
|---|---|---|---|
| 1,350,448 A * | 8/1920 | Graham | C03B 7/16 65/165 |
| 1,638,593 A * | 8/1927 | Mulholland | C03B 7/16 65/304 |
| 3,340,038 A * | 9/1967 | Hartman | C03B 7/16 65/304 |
| 5,511,593 A | 4/1996 | Sweetland | |
| 5,599,370 A * | 2/1997 | Struckmeier | C03B 7/16 65/304 |
| 9,019,365 B2 | 4/2015 | Akaji | |
| 2002/0046575 A1* | 4/2002 | Hayes | C03B 7/16 65/304 |
| 2005/0268654 A1 | 12/2005 | Haase | |
| 2011/0197635 A1 | 8/2011 | McDermott et al. | |

FOREIGN PATENT DOCUMENTS

EP    3189913 A    7/2017

* cited by examiner

*Primary Examiner* — Queenie S Dehghan
(74) *Attorney, Agent, or Firm* — Reinhart Boerner Van Deuren P.C.

(57) ABSTRACT

A gob trough for guiding a gob of molten glass is provided. The trough may be formed from trough segments that have a stepped configuration that reduces the amount of contact time between the gob and the trough. The trough may include surface formations that additionally reduce the contact time between the gob and the trough.

27 Claims, 10 Drawing Sheets

TROUGH TO THERMALLY BALANCE LOADED GOB TEMP

CROSS-REFERENCE TO RELATED PATENT APPLICATIONS

This patent application claims the benefit of U.S. Provisional Patent Application No. 62/915,359, filed Oct. 15, 2019, the entire teachings and disclosure of which are incorporated herein by reference thereto.

FIELD OF THE INVENTION

This invention generally relates to systems and methods of forming glass containers. More particularly, the invention relates to troughs for delivering glass gobs from a gob forming arrangement to molds of glass container forming machines.

BACKGROUND OF THE INVENTION

In glass container forming machines, molten glass is cut into cylinders of glass, referred to as gobs, which are then fed into molds, typically referred to as blank molds, where they are formed into parisons. The parisons are then transferred to molds, typically referred to as blow molds, in which the parisons are formed, typically by way of blow molding, into the shape of the container.

Further, most glass container forming machines are in the form of an individual section machine (I.S. Machine). The I.S. Machine has a plurality of individual sections that are used to form a plurality of containers. An I.S. Machine will often have between 8 to 16 individual sections of the same construction that are mounted side by side and arranged to operate out of phase with each other so that a substantially continuous flow of formed glass containers is produced. Typically, each section will include a blank molds and blow molds, and may be constructed to receive, 1, 2, 3, or 4 gobs of molten glass at a time into the corresponding number of blank molds (also referred to as parison molds) to form parisons which are then transferred into a corresponding number of blow molds to form the final shape of the container.

To provide high quality containers at a high speed with consistent results, it is important to maintain consistent temperatures throughout the gob of glass as it is delivered to the blank mold where it is then formed into the parison. If gob temperature control is deficient, thermal imbalance can occur within the gob which can result in an undesirable gob slumping effect in the blank mold cavity because the glass is viscoelastic. This slumping effect can then result in non-uniformly formed parisons, which will result in undesirably shaped and formed glass containers. For example poor gob shape can result in lower pack rates and reduced container wall thickness distributions.

Typically a single gob forming arrangement will cyclically feed all of the sections. However, the distance the gob must travel from the gob forming machine to the corresponding blank molds of the individual sections can affect the thermal balance within the gobs and thus the final shape and dimensions of the glass container.

One particular portion of the system that can affect the thermal balance of a gob of glass as it is delivered to a blank mold is the delivery system that carries the gob to the blank mold. The delivery system typically includes an upward facing trough and a downward facing deflector that contact and guide the gob toward and into the blank mold after the gob is formed and dispensed from a gob distributor. The trough will typically provide linear transport while the deflector will typically transition the motion from near horizontal to more vertical and into the blank mold.

The gob distributor will include one or more scoops from which the gob is dispensed from the gob distributor and into the upward facing trough.

The amount of time the gob contacts the delivery system as well as the amount of surface area interaction between the delivery system and gob affects the amount of heat transfer from the gob to the components of the delivery system. Again, if there is a large enough temperature difference between the opposed halves of the gob, when it loads into the blank mold it can slump, e.g. collapse, to the hotter side, which will typically be the non-trough side/deflector side or towards the outer ends of the machine.

The problem with this slumping within the blank mold is that this leads to uneven glass-to-metal contact within the blank mold resulting in uneven cooling and uneven glass thickness distribution in the resulting parison and then in the subsequently formed glass container.

The present invention provides improvements over the current state of the art as it relates to systems and methods for transporting the formed gobs to the blank molds within the glass container forming machine

BRIEF SUMMARY OF THE INVENTION

New and improved gob troughs are provided herein. In a particular trough, the trough includes an upward facing first trough segment and an upward facing second trough segment. The first trough segment defines an internal gob guide surface. The first trough segment has a first end and a second end. The second trough segment defines an internal gob guide surface. The second trough segment has a first end and a second end. The first trough segment is connected to the second trough segment with the second end of the first trough adjacent the first end of the second trough. The internal gob guide surface of the first trough at the second end of the first trough segment is vertically offset above the internal gob guide surface of the second trough at the first end of the second trough segment forming a vertical step when transitioning from the internal gob guide surface of the first trough to the internal gob guide surface of the second trough. This communicates the first trough segment with the second trough segment.

By providing separate trough segments that are connected together, the trough segments can be separately manufactured. This allows for troughs that are very long to be formed by casting, winch could not be done in the past due to the difficulty casting very long but thin products Further, by providing vertically offset trough segments, the contact time between a gob and the trough formed thereby can be reduced as the gob travels along the internal gob guide surfaces of the trough.

Optionally, the internal gob guide surface of at least one of the first and second trough segment includes a plurality of surface formations formed between the first and second ends of the corresponding trough segment. The surface formations being spaced apart such that a reduced interface area is provided between the gob and trough segment as if the surface formations were not present.

These surface formations can reduce the heat transfer from a gob to the trough to reduce temperature gradients within the gob. This is done by reducing the contact time of the various bottom portions of the gob as it travels within the trough.

Optionally, the internal gob guide surface of at least one of the first and second trough segment includes a plurality of surface formations formed between the first and second ends of the corresponding trough segment. The surface formations being spaced apart such that a gob traveling from the first end to the second end will simultaneously contact multiple surface formations.

Optionally, the internal gob guide surface of at least one of the first and second trough segment includes a plurality of surface formations formed between the first and second ends of the corresponding trough segment. The surface formation may be selected from the group consisting of slots, bumps, dips, holes, dimples and ribs.

Optionally, a bottom of the internal gob guide surface of the first trough segment extends longitudinally between the first end and second end along a first trough axis. The bottom of the internal gob guide surface of the second trough segment extends longitudinally between the first end and second end along a second trough axis. The first and second trough axes are vertically offset from one another such that when a gob travels from the first trough segment to the second trough segment, the gob becomes entirely airborne as the gob leaves the first trough segment and before the gob contacts the internal gob guide surface of the second trough segment.

Optionally, at least one of the first and second trough segment includes a plurality of surface formations formed between the first and second ends of the corresponding trough segment. The surface formations are in the form of a plurality of holes formed through a bottom portion of the trough segment.

Optionally, an angle between the internal gob guide surface and a portion of the holes closest the second end of the trough segment form an angle that is greater than ninety degrees.

Optionally, the holes have a tapered region where the holes interlace with the internal gob guide surface. The tapered region decreases in diameter when moving away from the internal gob guide surface.

Optionally, the plurality of holes includes a first row of holes that are spaced apart along a first axis. The first row of holes extending a first length between a first hole in the row and a last hole in the row. A second row of holes are spaced apart along a second axis. The second row of holes extend a second length between a first hole in the second row and a last hole in the second row. The second length is less than the first length.

Optionally, the first axis is aligned with a center of a bottom of the internal gob guide surface of the trough segment and the second axis is angularly offset from the first axis and the center of the bottom of the internal gob guide surface.

Optionally, a third row of holes that is identical to the second row of holes may be provided. The third row of holes defining a third axis. The third axis is offset from the center of the bottom of the internal gob guide surface and the first axis. The first axis is positioned angularly between the second and third axes.

Optionally, the holes are elongated slots.

Optionally, the internal gob guide surface of at least one of the first and second trough segment includes a plurality of surface formations formed between the first and second ends of the corresponding trough segment. The surface formations are in the form of axially spaced apart bumps that extend from the internal gob guide surface.

In one embodiment, a trough is provided. The trough includes an upward facing trough segment defining an internal gob guide surface. The trough segment has a first end and a second end. A plurality of surface formations are located along the internal gob guide surface and located axially between the first end and second end. The surface formations are located where the gob slides when traveling within the trough.

This embodiment includes the surface formations to reduce heat transfer out of the gob to reduce thermal gradients within the gob.

When a lubricant is added, these surface formations can also help accumulate the lubricant to reduce the amount of lubricant that will be reapplied overtime.

Optionally, the plurality of surface formations are in the form of a plurality of holes formed through a bottom portion of the trough segment.

Optionally, an angle between the internal gob guide surface and a portion of the holes closest the second end of the trough segment form an angle that is greater than ninety degrees. This angle can be provided for recesses that are not complete through holes as well.

Optionally, the holes have a tapered region where the holes interface with the internal gob guide surface. The tapered region decreases in diameter when moving away from the internal gob guide surface. This taper can be provided for recesses that are not complete through holes as well.

Optionally, the plurality of holes includes a first row of holes that are spaced apart along a first axis. The first row of holes extending a first length between a first hole in the row and a last hole in the row. A second row of holes are spaced apart along a second axis. The second row of holes extend a second length between a first hole in the second row and a last hole in the second row. The second length is less than the first length.

Optionally, the first axis is aligned with a center of a bottom of the internal gob guide surface of the trough segment and the second axis is angularly offset from the first axis and the center of the bottom of the internal gob guide surface.

Optionally, a third row of holes that is identical to the second row of holes may be provided. The third row of holes defining a third axis. The third axis is offset from the center of the bottom of the internal gob guide surface and the first axis. The first axis is positioned angularly between the second and third axes.

Optionally, the holes are elongated slots.

Optionally, the internal gob guide surface includes a plurality of surface formations formed between the first and second ends of the first trough segment. The surface formations are in the form of bumps that extend from the internal gob guide surface.

Optionally, a lubricant is applied to the internal gob guide surface and the surface formations.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
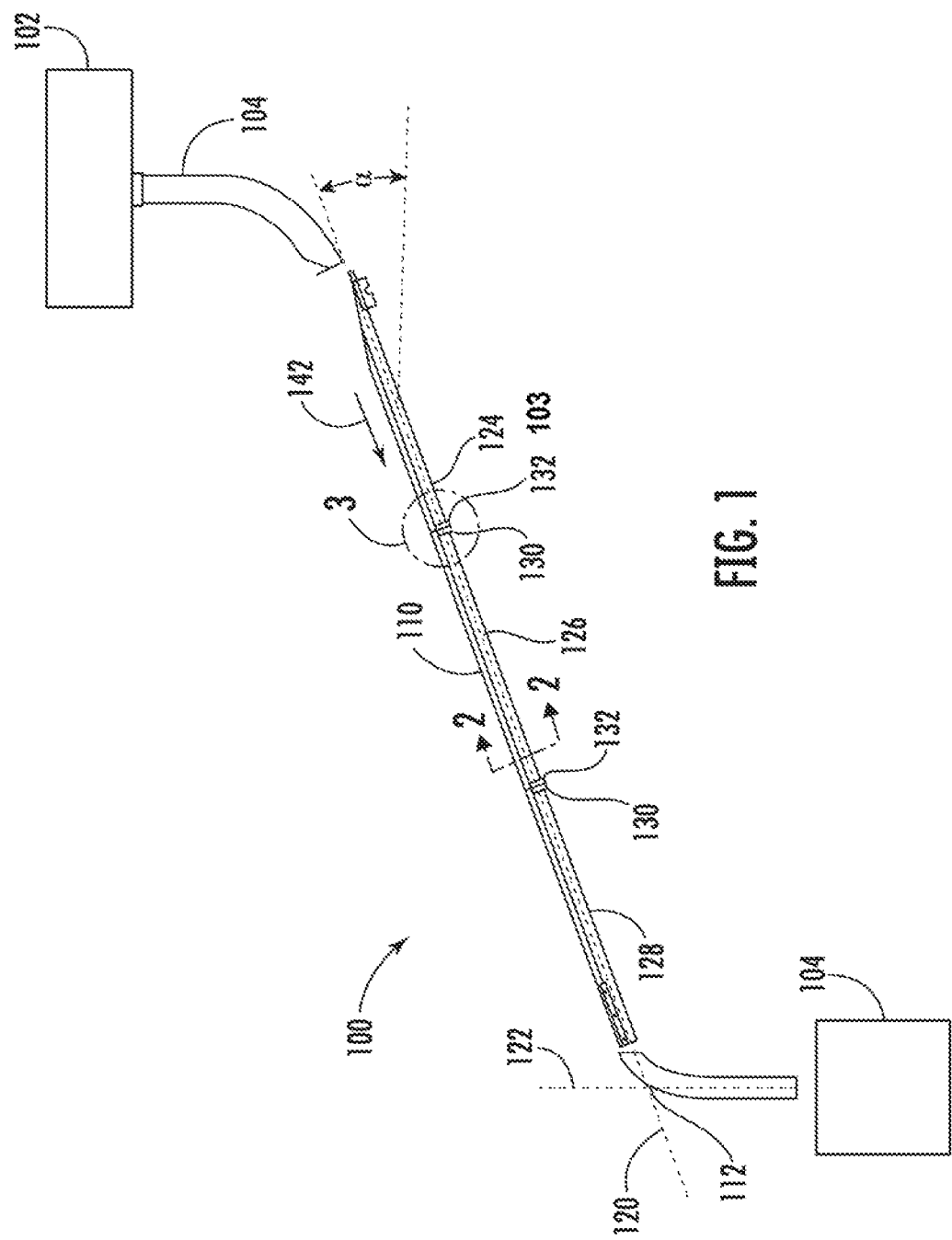
FIG. 1 is a simplified schematic illustration of a gob delivery system.

FIG. 1 illustrates a simplified version of a gob delivery system 100 for delivering gobs of molten glass from a gob distributor 102 to a mold 104, more preferably a parison mold, and more preferably a blank mold. Typically, the mold 104 will be part of an individual section of an Individual Section Machine (I.S. Machine) that includes a plurality of substantially identical sections for forming a plurality of glass containers.

The gob distributor 102 includes a scoop 103, or other means, for dispensing gobs into a gob trough 110 (also referred to simply as a trough 110). The gobs of glass will slide within the gob trough 110 to a deflector 112 and then into mold 104.

When installed, the gob trough 110 will typically be mounted at an angle α relative to horizontal such that the gobs will slide more easily therein.

The gob trough 110 is generally U-shaped in cross-section with an upward opening mouth. The deflector 112 will typically be U-shaped that is downward, at least at the upstream end thereof. The deflector 112 changes the direction of travel of the gob from generally horizontal and partly downward (see e.g. axis 120) as the gob travels within the gob trough 110 to substantially vertical (see e.g. axis 122) to direct the gob vertically downward into the mold 104.

In this embodiment, the gob trough 110 has a plurality of trough segments 124, 126, 128 that extend between opposed first and second ends. With reference to trough segment 126 and FIG. 2, the trough segments 124, 126, 128 are generally U-shaped to vertically support and guide the gobs.

The interior surface of the trough segments 124, 126, 128 will define an internal gob guide surface. This internal gob guide surface is the upward facing surface that defines the inner surface of the trough segments 124, 126, 128.

In the embodiment illustrated in FIG. 1, the plurality of trough segments 124, 126, 128 are generally aligned end-to-end to define a substantially continuous trough that guides the gobs.

By providing a segmented trough formed from a plurality of trough segments 124, 126, 128, an advantage over prior art design is provided. One method for forming the trough segments 124, 126, 128 is by way of metal casting. In particular, the trough segments 124, 126, 128 could be formed by cast iron. However, due to the length and relative wall thickness T, the length of a trough necessary to meet the entire length of the trough 110 could not be formed by casting process. As such, if cast iron was used to form prior troughs, the troughs would be required to be machined from cast iron plate which was extremely expensive.

In an embodiment, the length of a trough segment 124, 126, 128 does not exceed 800 mm, which better facilitates casting the segment.

The trough segments 124, 126, 128 include appropriate flanges 130, 132 for connecting adjacent ends of adjacent trough segments 124, 126, 128 together, such as by using bolts and nuts. The flanges 130, 132 may include alignment features, e.g. mating projections and receptacles, that axially engage to properly align the adjacent ends of the adjacent trough segments 124, 126, 128 during assembly prior to insertion of the required fasteners (e.g. bolts).

Figure 3:
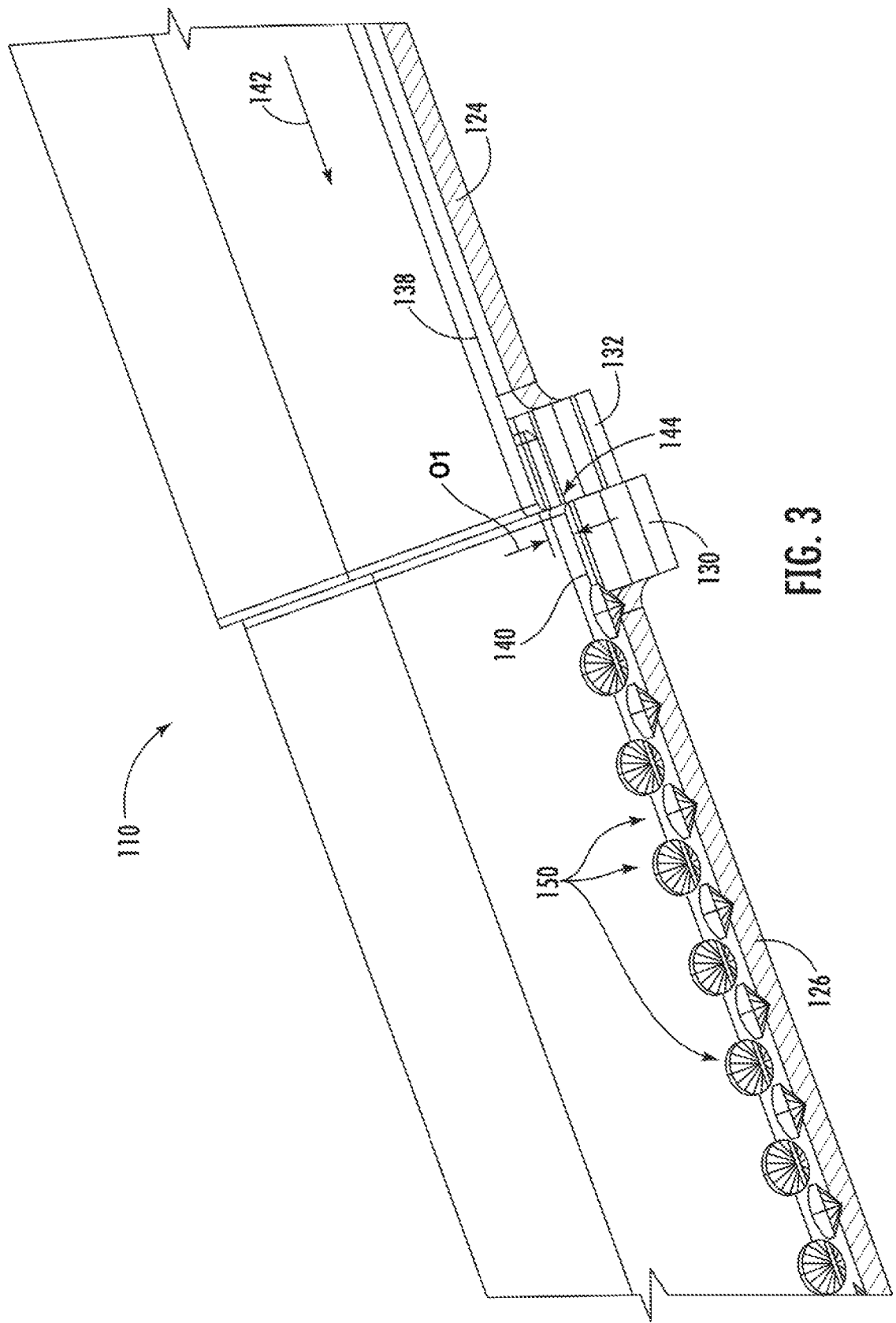
FIG. 3 is a partial cross-sectional illustration of one of the trough segments of the trough of the gob delivery system of FIG. 1.

With additional reference to FIG. 3, the trough segments 124, 126, 128 may be vertically offset from one another in a stepped arrangement. With reference to trough segments 124, 126, the bottoms 138, 140 thereof as well as the longitudinally extending trough axes defined thereby are offset from one another. More particularly, bottom 138 is offset an offset value O1 from bottom 140. While only the transition between trough segments 124, 126 is illustrated, the transition between trough segments 126 and 128 may or may not be similarly offset or if offset, offset to a same degree.

Typically, the offset is perpendicular to the longitudinal axis of the corresponding trough segments 124, 126, 128. As the segments 124, 126, 128 are generally angled relative to horizontal, the offset will typically not be perfectly vertical but will have, at least in part, a vertical component.

The stepped arrangement is such that the downstream trough segment 126 (relative to trough segment 124) is vertically lower than the upstream segment 124. In a preferred arrangement, angle α (see FIG. 1) is such that a gob sliding along bottom 138 of trough segment 124 will get completely airborne as it crosses the interface 144 and corresponding step as the gob exits from trough segment 124 and enters trough segment 126 when traveling in the direction illustrated by arrow 142 in FIGS. 1 and 3. This configuration reduces the amount of contact time that the gob will remain in contact with the trough 110 reducing the amount of heat transferred out of the gob to the trough 110 from a bottom side of the gob. This is due to the fact that heat transfer from the gob to the trough is greater than from the gob to the air. By reducing the heat transfer from the bottom of the gob to the trough 110, the heat transfer out of the gob is more consistent reducing the temperature gradient between the bottom side of the gob (e.g. side that contacts the trough) and the top side of the gob (e.g. the side that faces away from the trough).

Trough 110 includes a plurality of surface formations 150. The surface formations 150 in this embodiment are only provided in the middle trough segment 126 but could be in any one or more of the trough segments 124, 126, 128.

The surface formations 150 are formed adjacent the internal gob guide surface of the trough or trough segment.

Figure 2:
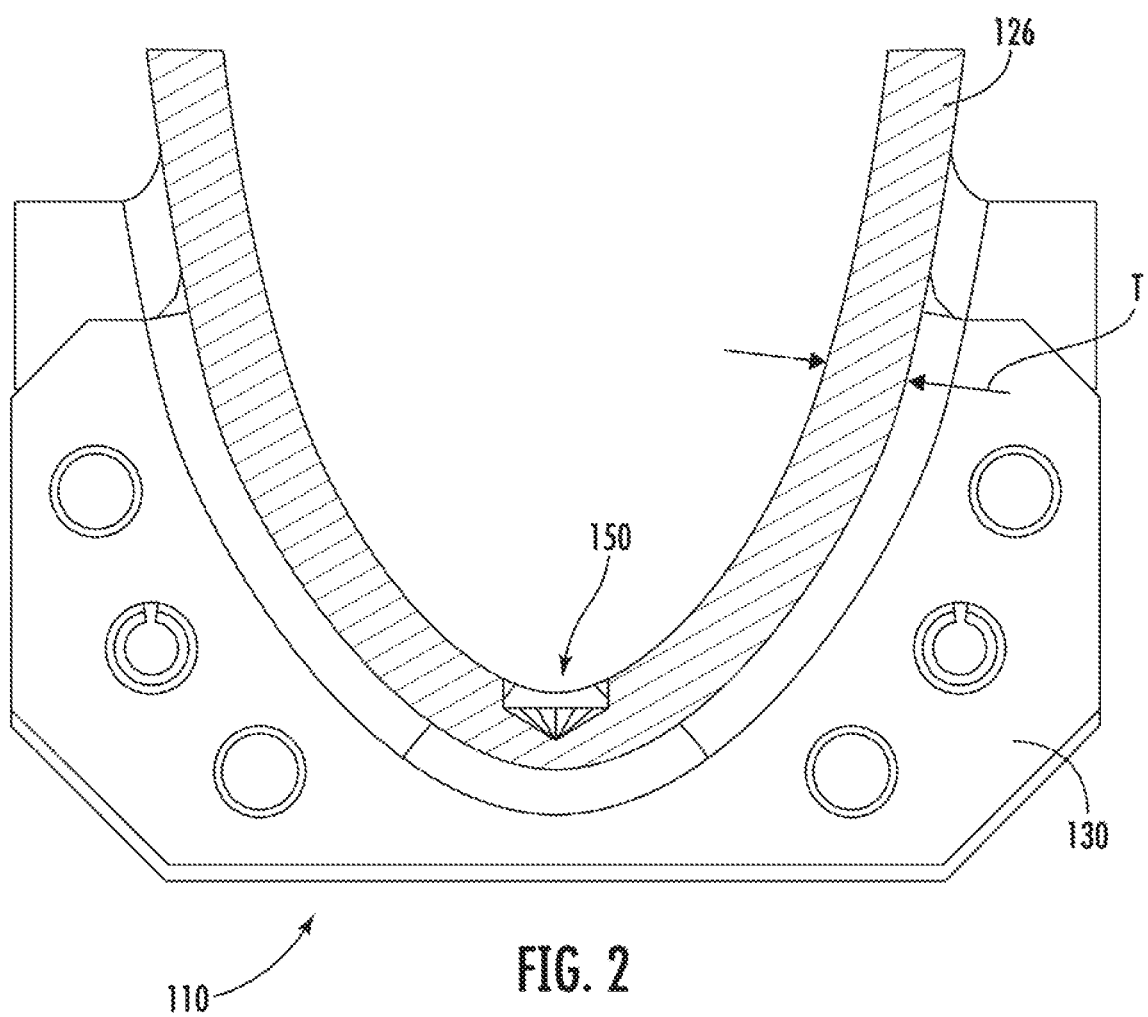
FIG. 2 is a cross-sectional illustration of the trough of the gob delivery system of FIG. 1.

In the embodiment of FIGS. 1-3, the surface formations 150 are in the form of recesses formed into the upward facing internal gob guide surface. The recesses, in this embodiment, do not extend entirely through the thickness T of the sidewall that defines the U-shape.

The surface formations are located in the bottom region of the trough 110 where the bottom side of the gob would contact the trough.

The inclusion of the surface formations reduces the amount of contact area between the bottom side of the gob and the trough 110 when the gob is sliding within the U-shaped trough 110 as compared to a trough that did not include the surface formations. By reducing the area of the interface between the gob and the trough, heat transfer between the gob and the trough 110, and particularly between the bottom of the gob and the trough, is reduced.

As indicated above, by reducing the heat transfer out of the bottom of the gob due to gob-trough contact, a temperature gradient between the bottom of the gob (typically cooler) and the top of the gob (typically warmer) is reduced. This reduces the likelihood of undesirable slumping of the gob to one side within the downstream mold due to uneven temperature distribution.

The surface formations 150 are axially spaced apart along the longitudinal length of the trough 110 or tough segment 124, 126, 128 less than the axial length of gob. Preferably, the surface formations are axially spaced apart along the longitudinal length of the trough such that a gob travel parallel to direction 142 will simultaneously contact multiple surface formations.

It is also a feature that by providing the surface formations 150 that any lubricant that is applied to the internal gob guiding surface will accumulate on the surfaces of the surface formations. This can lead to reduced total lubrication consumption and improved lubrication consistency.

Figure 4:
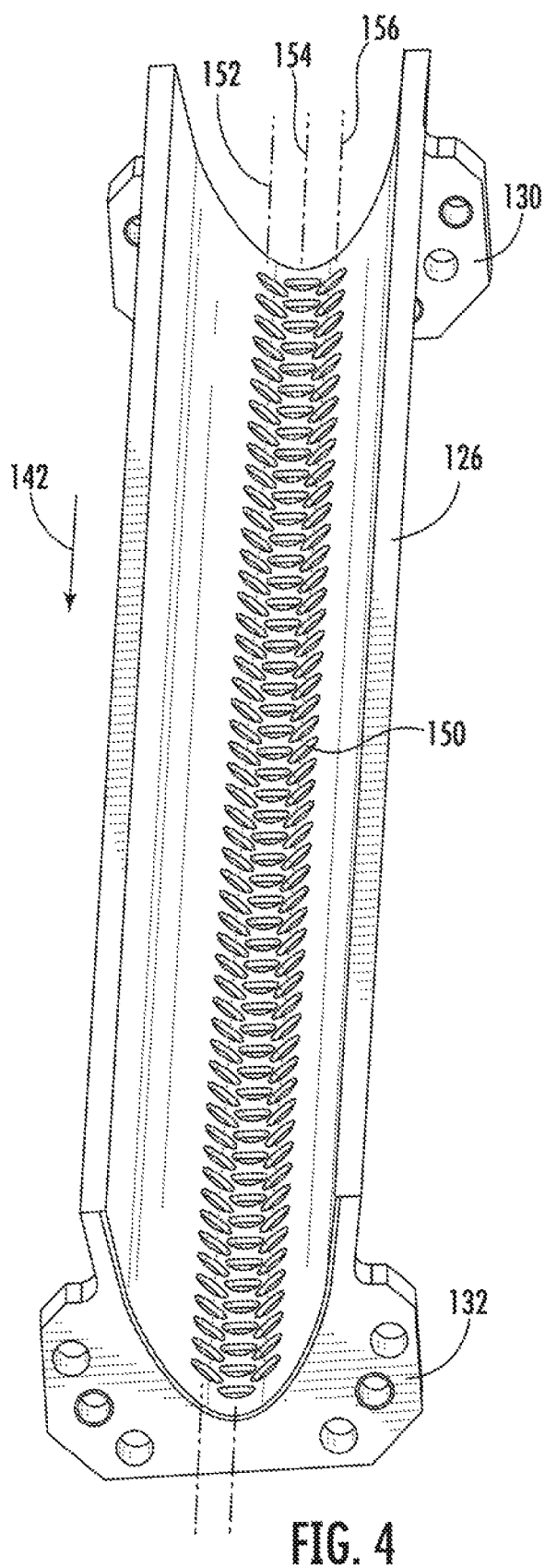
FIG. 4 is a top perspective illustration of one of the trough segments.

With reference to FIG. 4, the surface formations are axially aligned in a plurality of rows. More particularly, in this embodiment, the surface formations 150 form three longitudinally extending rows. Each row has the corresponding surface formations 150 axially spaced apart along corresponding axes 152, 154, 156. In this embodiment, axis 154 is located substantially coaxially with the bottom/center of the U-shaped trough segment 126. The other two axes 152, 156 are laterally offset from but parallel to axis 154. In this embodiment, axes 152, 156 may be considered to be angularly offset from axis 154 as well as axes 152, 154 and 156 are not co-planar.

Figure 5:
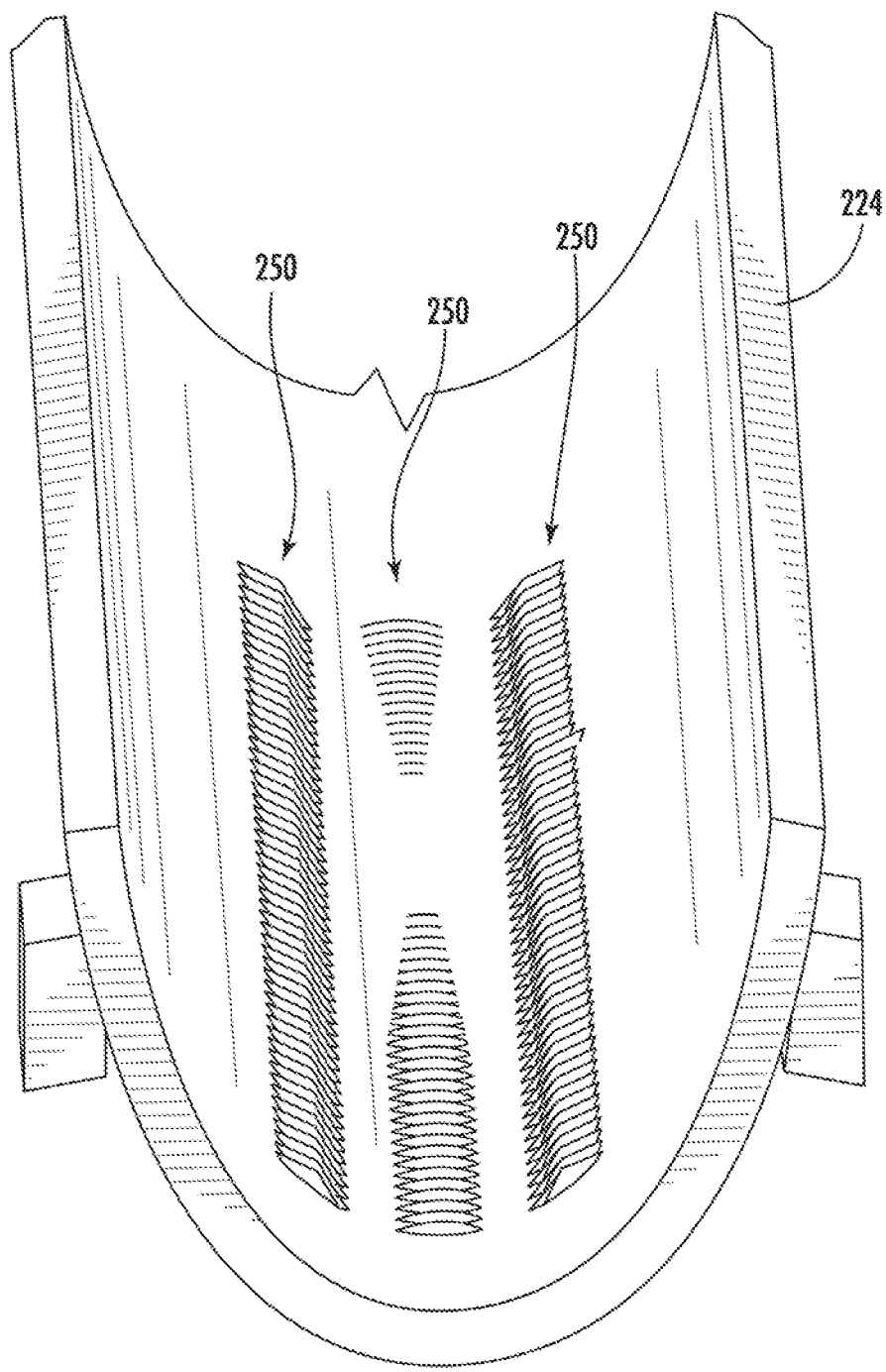
FIG. 5 is a top perspective illustration of an alternative embodiment of a trough segment.
Figure 6:
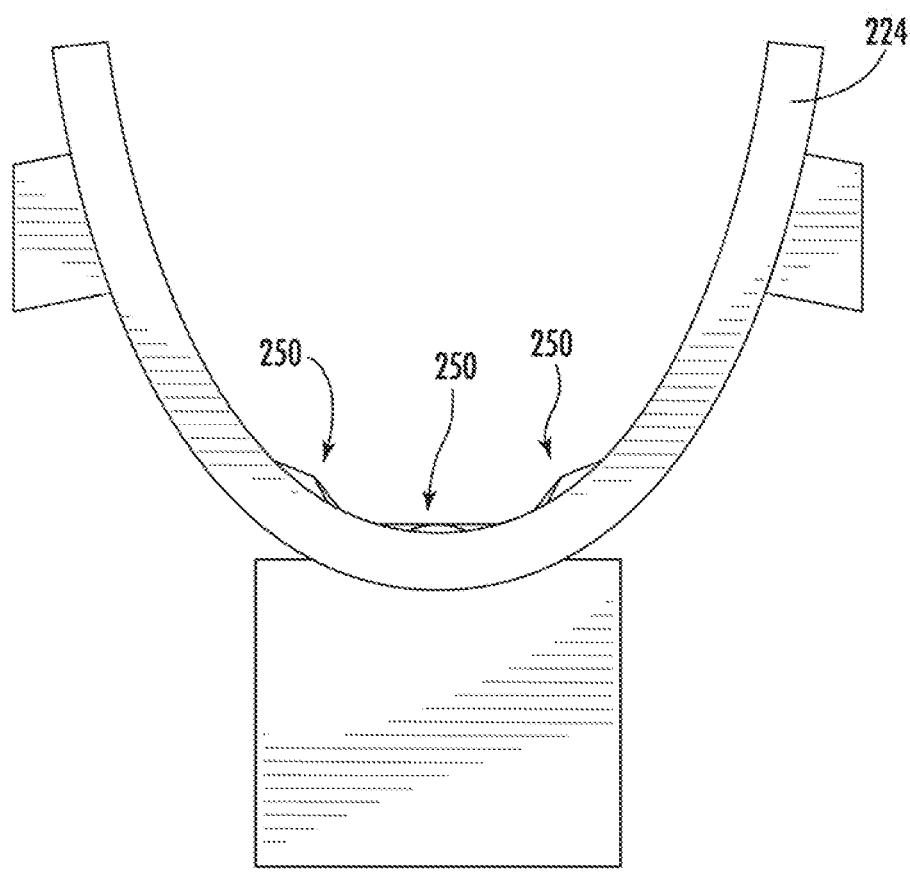
FIG. 6 is an end view of the trough segment of FIG. 5.

FIGS. 5 and 6 illustrate a further embodiment of a trough segment 224. In this embodiment, the surface formations 250 are in the form of bumps that extend outward from the internal gob guide surface of the trough segment 224.

Figure 7:
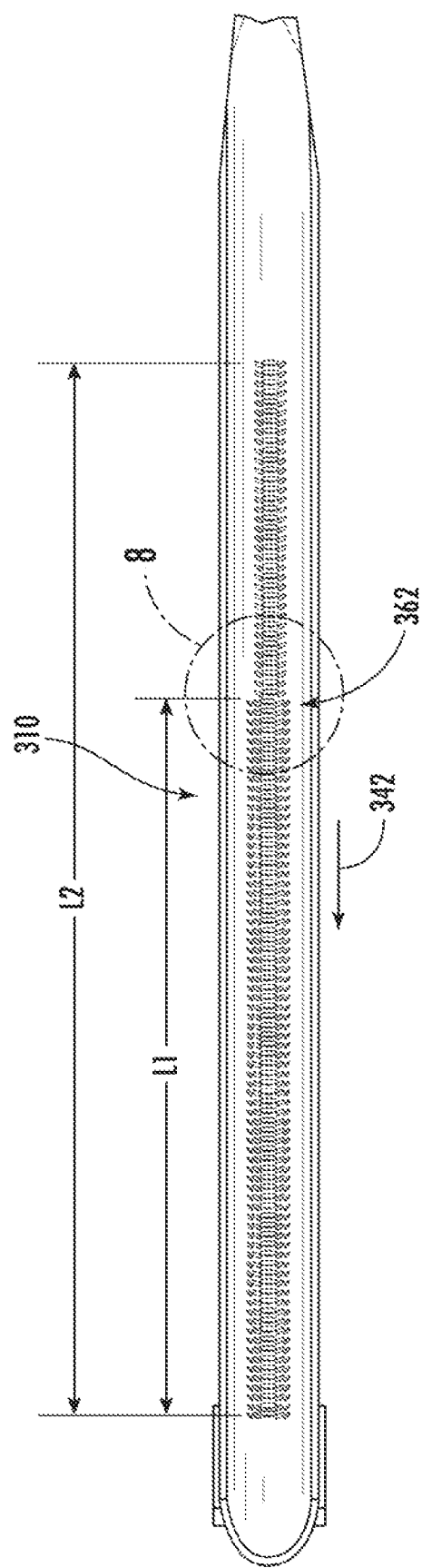
FIG. 7 is a top perspective illustration of an alternative embodiment of a trough segment.

FIG. 7 illustrates a trough 310 that is formed from a single segment.

The surface formations 350 of this embodiment are in the form of holes that extend entirely through the thickness of the trough 310.

The surface formations 350 are longitudinally offset from one another and define longitudinally extending axes 352, 354, 356, 358, 360 that are generally parallel to one another and laterally offset. Again, in this embodiment, the axes 352, 354, 356, 358, 360 may be considered to be angularly offset from one another as well.

In this embodiment, the two laterally outer most rows that define axes 352 and 360 extend a longitudinal length L1 that is less than the longitudinal length L2 of the laterally inner rows that define axes 354, 356, 358. It is noted that the upstream most surface formation 350 of the two laterally outer rows are axially offset from the upstream most surface formations 350 of the three inner rows. As such, the laterally outer rows start at a downstream location relative to the inner rows. This is illustrated at area 362 in FIGS. 7 and 8. Arrow 342 illustrates the direction of travel of gobs within the trough 310.

Figure 8:
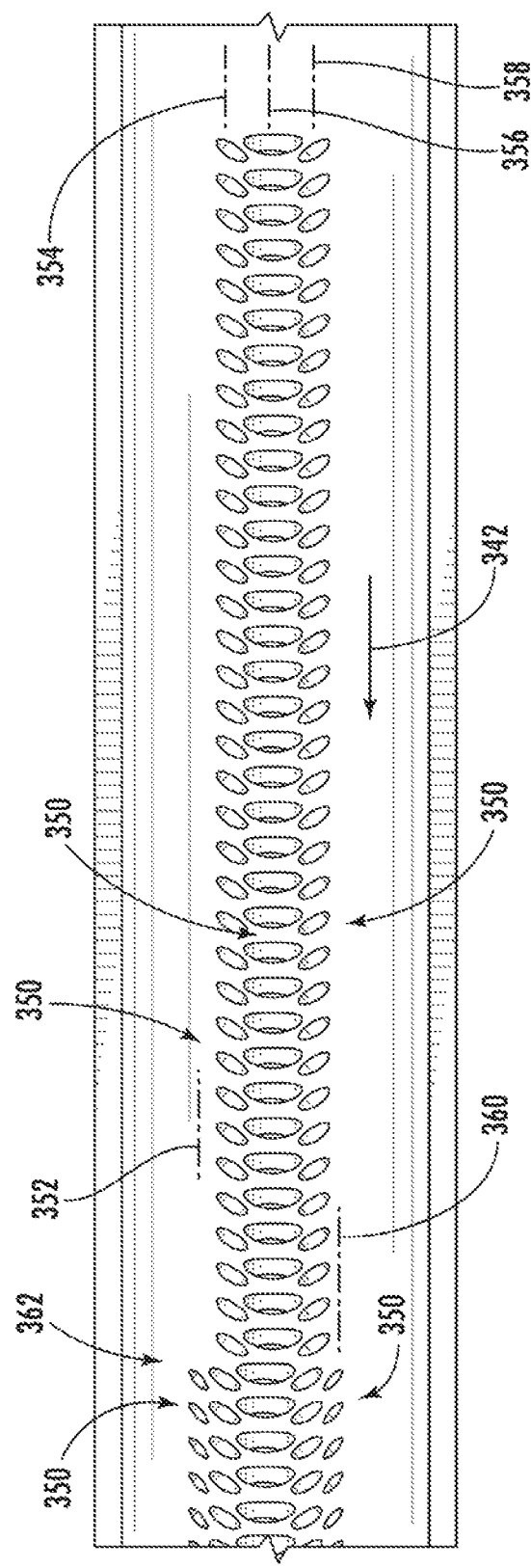
FIG. 8 is an enlarged top perspective illustration of the trough segment of FIG. 7.
Figure 9:
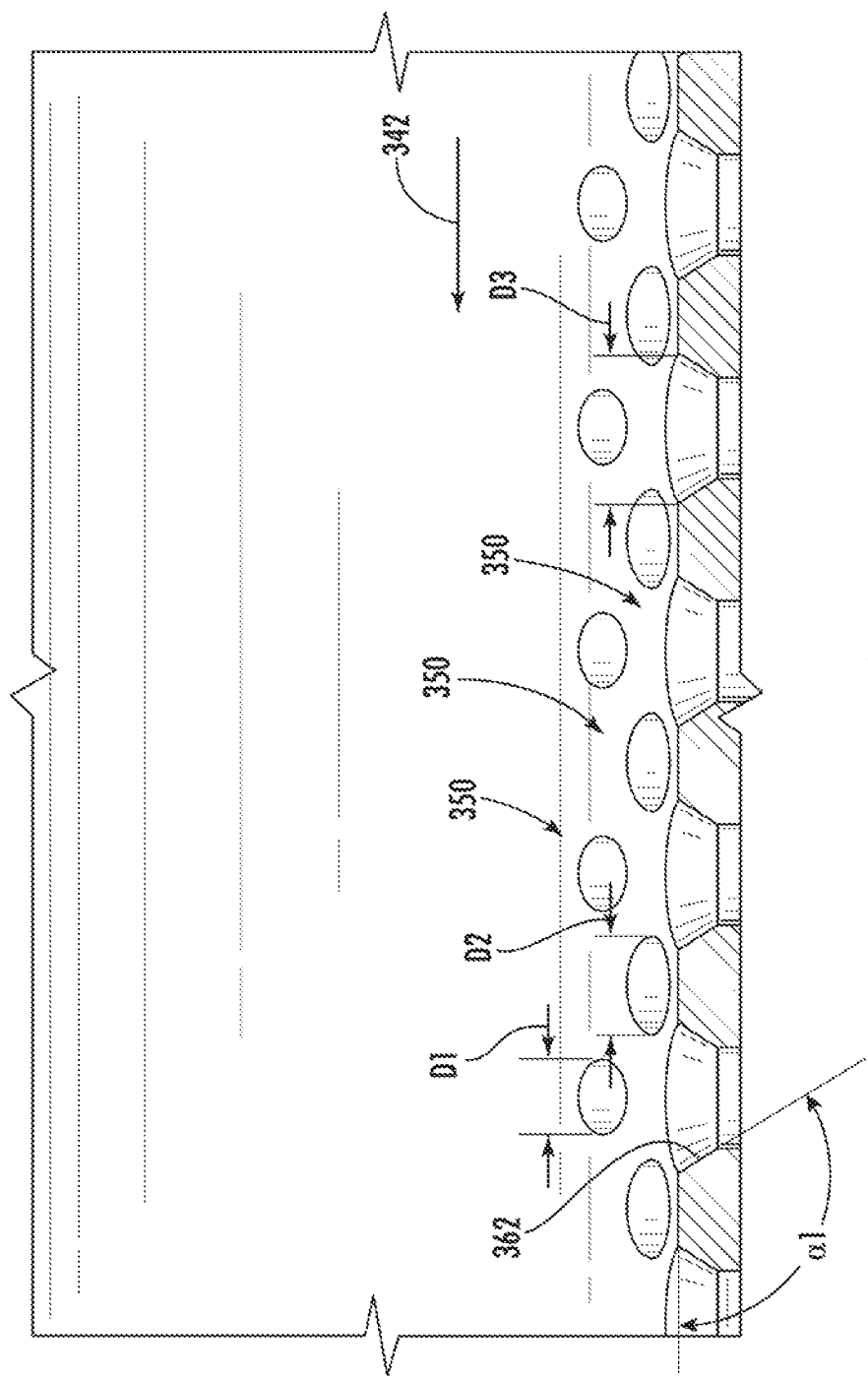
FIG. 9 is a partial cross-sectional illustration of the trough segment of FIG. 7.

With reference to FIGS. 8 and 9, the diameter of the surface formations 350, at least where they intersect with the internal gob guide surface of the trough 310, have different values. More particularly, the diameter D1 of the surface formations 350 of the outer most two rows that define axes 352, 360 are smaller than the other surface formations. The middle row of surface formations 350 that defines axis 356 has the largest diameter D3 while the two intermediate rows that define axes 354 and 358 have an intermediate diameter D2 that is between the diameters D3 and D1 of the middle row and the outer two most rows.

The holes of some or all of the surface formations 350 may have a tapered region 362 proximate the interface of the holes with the internal surface of the trough 310. In this embodiment, only the middle row has a taper but oilier ones of die holes may have such a taper. It is preferred that, at a minimum, the downstream portion 362 of the hole has a taper with an angle α1 that is greater than 90 degrees relative to the inner surface of the trough 310 to promote smoother traveling of the gob over the holes. The tapered region decreases in diameter when moving away from the internal gob guide surface.

Figure 10:
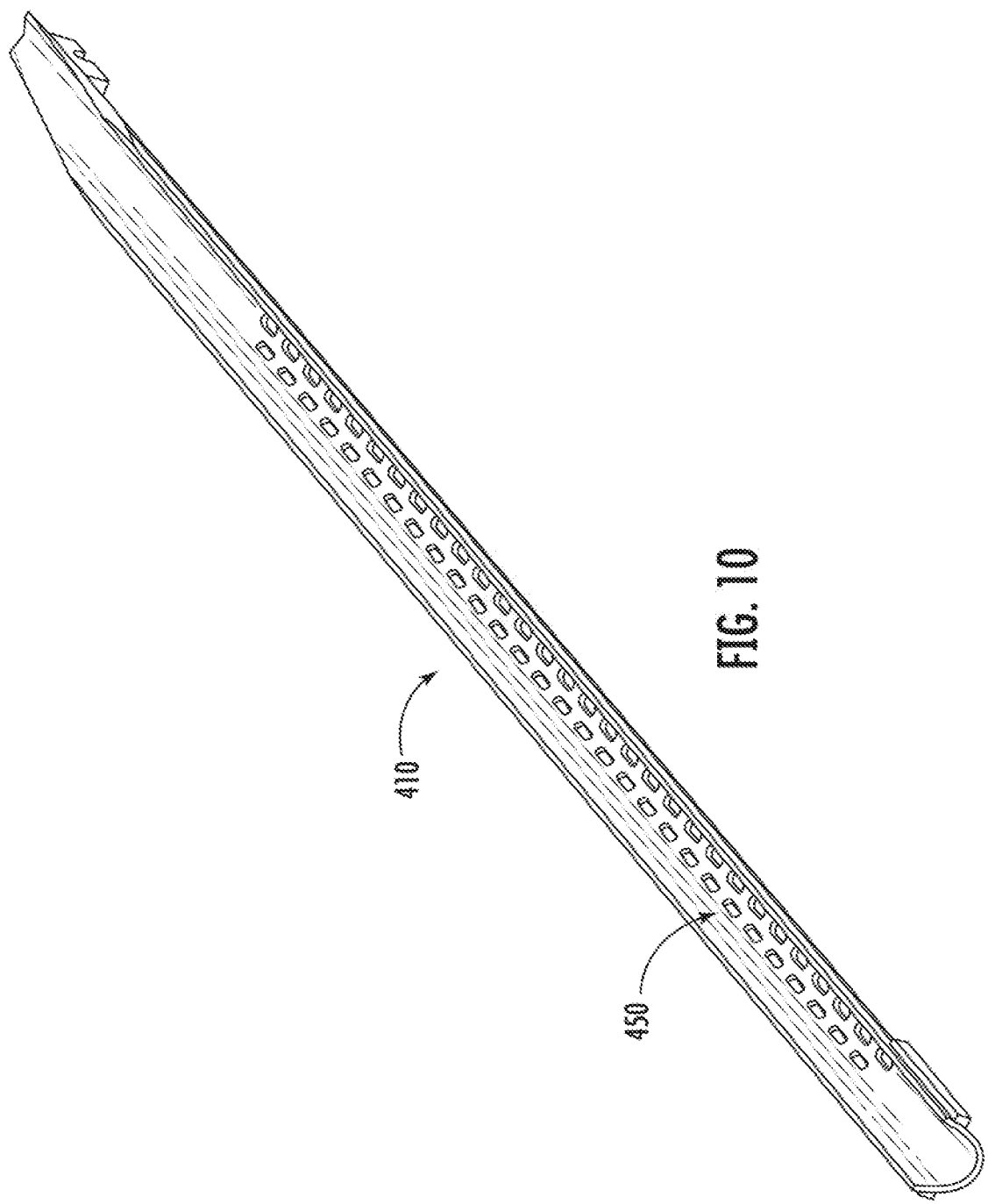
FIG. 10 is a top perspective illustration of an alternative embodiment of a trough segment.

With reference to FIG. 10, the surface formations 450 of trough 410 embodiment are rows of elongated slots.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to lie practiced otherwise than as specifically described herein. Accordingly, this invention includes all modifications and equivalents of the subject matter recited in the claims appended hereto as permitted by applicable law. Moreover, any combination of die above-described elements in all possible variations thereof is encompassed by the invention unless otherwise indicated herein or otherwise clearly contradicted by context.

What is claimed is:

1. A trough for guiding glass gobs comprising:
an upward facing first trough segment defining an internal gob guide surface, the first trough segment having a first end and a second end;
an upward facing second trough segment defining an internal gob guide surface, the second trough segment having a first end and a second end, the first trough segment being connected to the second trough segment with the second end of the first trough adjacent the first end of the second trough; and
the internal gob guide surface of the first trough at the second end of the first trough segment being vertically offset above the internal gob guide surface of the second trough at the first end of the second trough segment forming a vertical step when transitioning from the internal gob guide surface of the first trough to the internal gob guide surface of the second trough;
wherein the internal gob guide surface of at least one of the first and second trough segment includes a plurality of surface formations formed between the first and second ends of the corresponding trough segment, the plurality of surface formations includes:
a first row of surface formations that are spaced apart along a first axis extending between the first and second ends, the surface formations of the first row of surface formations having a first dimension parallel to the first axis;
a second row of surface formations that are spaced apart along a second axis parallel to and offset from the first axis, the surface formations of the second row of surface formations having a second dimension parallel to the second axis, the second dimension being less than the first dimension.

2. The trough of claim 1, wherein the surface formations are spaced apart such that a reduced interface area is provided between the gob and trough segment as if the surface formations were not present.

3. The trough of claim 1, wherein the surface formations are spaced apart such that a gob traveling from the first end to the second end will simultaneously contact multiple surface formations.

4. The trough of claim 1, wherein the surface formation are selected from the group consisting of slots, bumps, dips, holes, dimples and ribs.

5. The trough of claim 1, wherein:
a bottom of the internal gob guide surface of the first trough segment extends longitudinally between the first end and second end along a first trough axis;
a bottom of the internal gob guide surface of the second trough segment extends longitudinally between the first end and second end along a second trough axis; and
the first and second trough axes are vertically offset from one another such that when a gob travels from the first trough segment to the second trough segment, the gob becomes entirely airborne as the gob leaves the first trough segment and before the gob contacts the internal gob guide surface of the second trough segment.

6. The trough of claim 1, wherein the surface formations of the first and second rows of surface formations are holes formed through a bottom portion of the trough segment.

7. The trough of claim 6, wherein an angle between the internal gob guide surface and a portion of the holes closest the second end of the trough segment is greater than ninety degrees.

8. The trough of claim 6, wherein the holes have a tapered region where the holes interface with the internal gob guide surface, wherein the tapered region decreases in diameter when moving away from the internal gob guide surface.

9. The trough of claim 8, wherein:
angle between the internal gob guide surface and a portion of the holes closest the second end of the trough segment form an angle that is greater than ninety degrees;
the plurality of holes includes:
a first row of holes that are spaced apart along a first axis, the first row of holes extending a first length between a first hole in the row and a last hole in the row;
a second row of holes that are spaced apart along a second axis, the second row of holes extending a second length between a first hole in the second row and a last hole in the second row, the second length being less than the first length.

10. The trough of claim 6, wherein the first row of holes extends a first length between a first hole in the row and a last hole in the row;
the second row of holes extends a second length between a first hole in the second row and a last hole in the second row, the second length being less than the first length.

11. The trough of claim 10, further comprising a third row of holes that is identical to the second row of holes, the third row of holes defining a third axis, the third axis being offset from the center of the bottom of the internal gob guide surface and the first axis, the first axis being positioned angularly between the second and third axes.

12. The trough of claim 6, wherein the holes are elongated slots.

13. The trough of claim 1, wherein the first axis is aligned with a center of a bottom of the internal gob guide surface of the corresponding trough segment and the second axis is angularly offset from the first axis and the center of the bottom of the internal gob guide surface.

14. The trough of claim 1, wherein the surface formations are in the form of bumps that extend from the internal gob guide surface.

15. The trough of claim 1, wherein the second end of the first trough segment abuts the first end of the second trough segment.

16. The trough of claim 1, wherein:
the second end of the first trough segment includes a first flange;
the first end of the second trough segment includes a second flange;
the first flange being secured to the second flange to connect the first trough segment to the second trough segment with the first trough segment abutting the second trough segment.

17. A trough comprising:
an upward facing trough segment defining an internal gob guide surface, the trough segment having a first end and a second end; and
a plurality of surface formations located along the internal gob guide surface and located axially between the first end and second end;
wherein the plurality of surface formations includes:

a first row of surface formations that are spaced apart along a first axis, the first row of surface formations extending a first length between a first surface formation in the first row and a last surface formation in the first row, the surface formations of the first row of surface formations having a first dimension parallel to the first axis; and a second row of surface formations that are spaced apart along a second axis, the second row of surface formations extending a second length between a first surface formation in the second row and a last surface formation in the second row, the second length being less than the first length, the surface formations of the second row of surface formations having a second dimension parallel to the second axis, the second dimension being less than the first dimension.

18. The trough of claim 17, wherein the plurality of surface formations are in the form of holes formed through a bottom portion of the trough segment.

19. The trough of claim 18, wherein an angle between the internal gob guide surface and a portion of the holes closest the second end of the trough segment is greater than ninety degrees.

20. The trough of claim 18, wherein the holes have a tapered region where the holes interface with the internal gob guide surface, wherein the tapered region decreases in diameter when moving away from the internal gob guide surface.

21. The trough of claim 18, wherein the holes are elongated slots.

22. The trough of claim 18, wherein:
angle between the internal gob guide surface and a portion of the holes closest the second end of the trough segment form an angle that is greater than ninety degrees;

the plurality of holes includes:
a first row of holes that are spaced apart along a first axis, the first row of holes extending a first length between a first hole in the row and a last hole in the row;

a second row of holes that are spaced apart along a second axis, the second row of holes extending a second length between a first hole in the second row and a last hole in the second row, the second length being less than the first length.

23. The trough of claim 17, wherein the surface formations are in the form of bumps that extend from the internal gob guide surface.

24. The trough of claim 17, further comprising a lubricant applied to the internal gob guide surface and the surface formations.

25. The trough of claim 17, wherein:
the internal gob guide surface has a bottom;
the first row of surface formations is formed at the bottom or is a row of surface formations closest to the bottom;
the second row of surface formations being spaced a furthest distance from the bottom.

26. The trough of claim 17, further comprising a third row of surface formations that is identical to the second row of surface formations, the third row of surface formations defining a third axis, the second and third axes being offset from a center of a bottom of the internal gob guide surface and the first axis, the first axis being positioned angularly between the second and third axes, the second row of surface formations being a furthest row of surface formations from the center on a first side of the center and the third row of surface formations being a furthest row of surface formations from the center on a second opposite side of the center.

27. The trough of claim 17, wherein the trough segment defines a bottom, the second axis being spaced a greater distance from the bottom than the first axis.

* * * * *